(12) United States Patent
McMillan et al.

(10) Patent No.: US 8,069,484 B2
(45) Date of Patent: Nov. 29, 2011

(54) SYSTEM AND METHOD FOR DETERMINING DATA ENTROPY TO IDENTIFY MALWARE

(75) Inventors: Chad McMillan, Alexandria, VA (US); Jason Garman, Leesburg, VA (US)

(73) Assignee: Mandiant Corporation, Alexandria, VA (US)

( * ) Notice: Subject to any disclaimer, the term of this patent is extended or adjusted under 35 U.S.C. 154(b) by 1218 days.

(21) Appl. No.: 11/657,541

(22) Filed: Jan. 25, 2007

(65) Prior Publication Data

US 2008/0184367 A1   Jul. 31, 2008

(51) Int. Cl.
*G06F 11/00* (2006.01)
(52) U.S. Cl. ............... 726/23; 726/22; 726/24; 726/25; 726/26; 713/194
(58) Field of Classification Search ............. 726/22–26; 713/194
See application file for complete search history.

(56) References Cited

U.S. PATENT DOCUMENTS

| | | | | |
|---|---|---|---|---|
| 6,661,839 | B1 * | 12/2003 | Ishida et al. | 375/240 |
| 2005/0223238 | A1 * | 10/2005 | Schmid et al. | 713/188 |
| 2007/0152854 | A1 * | 7/2007 | Copley | 341/51 |
| 2007/0245420 | A1 * | 10/2007 | Yong et al. | 726/23 |

OTHER PUBLICATIONS

PEID (Software): http://peid.has.it/; May 10, 2006—five (5) web pages.
Shannon, C. E.; "A Mathematical Theory of Communication"; The Bell System Technical Journal; vol. 27; pp. 39-423; 23-656—Jul., Oct. 1948.

* cited by examiner

*Primary Examiner* — Thanhnga Truong
*Assistant Examiner* — Angela Holmes
(74) *Attorney, Agent, or Firm* — SNR Denton US LLP (57) ABSTRACT

Systems and methods for performing malware detection for determining suspicious data based on data entropy are provided. The method includes acquiring a block of data, calculating an entropy value for the block of data, comparing the entropy value to a threshold value, and recording the block of data as suspicious when the entropy value exceeds the threshold value. An administrator may then investigate suspicious data.

16 Claims, 5 Drawing Sheets

SYSTEM AND METHOD FOR DETERMINING DATA ENTROPY TO IDENTIFY MALWARE

FIELD OF THE INVENTION

The present invention generally relates to malware detection and more specifically relates to using a determination of data entropy to detect malware.

BACKGROUND

A common problem facing information security personnel is the need to identify suspicious or outright malicious software or data on a computer system. This problem typically arises when a computer system is compromised by an attacker through a piece of malicious software. Initial steps taken in response to this kind of situation include attempts to identify malicious software (also known as "malware") or data, followed by attempts to classify that malicious software so that its capabilities can better be understood. Investigators and response personnel use a variety of techniques to identify suspicious software, such as temporal analysis, filtering of known entities, and Live Response (described below).

Temporal analysis involves a review of all activity on a system according to date and time so that events occurring on or around a time window of suspected compromise can be more closely examined. Such items might include event log entries; files created, deleted, accessed, or modified; processes that were started or terminated; network ports opened or closed, and so on.

Additionally a comparison of files against known entities can be performed. In this situation, all files on the system may be reviewed and compared against a database of known, previously encountered files. Such comparisons are usually accomplished through use of a cryptographic hash algorithm—a mathematical function that takes the data from a file and turns it into a compact numerical representation. A fundamental property of hash functions is that if two hashes generated using the same algorithm are different, then the data used to generate those hashes must also be different. The corollary is that hashes found to match were generated from data that was identical. While the corollary is not always true, hash collisions (identical hashes generated from different input data) for cryptographic hash algorithms are provably rare such that a hash comparison can be used to determine file equivalence.

An alternative to reviewing static historical data such as files and event logs is Live Response. This technique examines running programs, system memory contents, network port activity, and other system metadata while the computer system is still on and in a compromised state in order to identify how it may have been modified by an attacker.

There are many other techniques that may be employed to identify suspicious activity on a potentially compromised computer system. These techniques often generate a rather large amount of data, all of which must be reviewed and interpreted in order to reach any conclusions. Further complicating this equation is the fact that attackers typically have a good understanding of the techniques used to identify compromised systems. They employ various methods to hide their presence, making the job of an investigator that much more difficult. Some of these techniques include deleting indicators of their entry to a system once it's compromised, such as log file entries, file modification/access dates, and system processes. Attackers may also obfuscate running malware by changing its name or execution profile such that it appears to be something benign. In order to better hide malware or other data stored on disk, attackers may make use of a "packed" storage format. Packing is a technique by which data is obfuscated or encrypted and encapsulated along with a program to perform a decryption/de-obfuscation, and then stored somewhere on a system. For example, a "Packed Executable" is a piece of software that contains an "unpacking" program and a payload. That payload is often malicious software, such as a virus or Trojan Horse.

One of the fundamental properties of encrypted, compressed, or obfuscated data (depending on the method of obfuscation) is its entropy, or randomness, tends to be higher than that of "structured" data, such as user generated documents and computer programs. A measure of entropy isn't a guaranteed method for identifying malware or an attacker's hidden data store. A valid system user may have encrypted, or more commonly, compressed, information stored on a computer system. However, the examination of entropy does provide an excellent filter for this significant data reduction problem. Entropy is a measurement that can be used to determine if a stream of data is random, provided it is comprised of a defined set of data values. There are drawbacks to using entropy across a block of data, though. Entropy is a global measurement across a data set, returning a single value across that set. This means that a data block could return a low entropy measurement when in fact small sections of that same data could contain very high entropy. This scenario could be true even if the majority of the data block has low entropy. This may be noteworthy, depending on the expectation of the contents of the data. For example, if an attacker has placed an encrypted copy of malware inside of a more structured set of data, the variance of entropy across that otherwise structured data may be a clear indicator of malware. Thus, there is a need in the art for a technique to derive a robust measurement of entropy in order to detect the presence of malware in a computer system while reducing the number of false positives generated during the detection process.

SUMMARY

Methods and systems consistent with embodiments of the invention review arbitrary blocks of data from a computer system and identify that data's entropic characteristics to reach conclusions about how suspicious or interesting the data may be. In accordance with one embodiment consistent with the invention, an entropy determination method is comprised of a specific combination of techniques that divide a piece of data from a computer system into pieces, applies commonly used mathematical techniques for determining entropy across those pieces, and then recombines the entropy values from the divided data elements to calculate an overall entropy value that can be used as a method to filter data from a computer system. When this entropy calculation is combined with observations about a block of data's other fundamental characteristics (or "metadata"), a reasonable conclusion can be reached as to whether it is suspicious or not during the course of an investigation or response to a computer security incident.

The terms "suspicious" and "interesting" are commonly used in the context of computer and network security to refer to data that might be an indication of a compromised computer system, or related directly to a compromising technique. The entropy characteristics of data may also be interesting in circumstances other than computer security incidents. For example, entropy is a common indicator of compressed or encrypted data, which may be interesting in intelligence, law enforcement, legal compliance, policy compliance, or regulatory fields.

One embodiment consistent with the present invention is directed to a malware detection method in a data processing system for determining suspicious data based on data entropy. The method includes acquiring a block of data, calculating an entropy value for the block of data, comparing the entropy value to a threshold value, and recording the block of data as suspicious when the entropy value exceeds the threshold value. The method may further include reporting suspicious data to an administrator. Calculating an entropy value may include calculating Shannon Entropy (described below) for the block of data, calculating a global entropy value for the block of data, and calculating a sample entropy value for the block of data.

Calculating a sample entropy value may include dividing the block of data into samples, iteratively calculating an individual sample entropy value for each sample to create a plurality of individual sample entropy values, and performing a statistical method on the plurality of individual sample entropy values to calculate the sample entropy value. Performing a statistical method may include calculating the mean and standard deviation of the plurality of individual sample entropy values, and adding one standard deviation to the mean.

Comparing the entropy value to a threshold value may include comparing both the global entropy value and the sample entropy value to the threshold. Recording the block of data as suspicious when the entropy value exceeds the threshold value may include recording the block of data as suspicious when the global entropy value or the sample entropy value exceeds the threshold. The method may further include examining metadata for the block of data for suspicious features. In one embodiment consistent with the present invention, the threshold is 0.9.

Another embodiment consistent with the present invention is directed to a computer-readable medium having computer-executable instructions for performing a method of malware detection for determining suspicious data based on data entropy. The method includes the steps of acquiring a block of data, calculating an entropy value for the block of data, comparing the entropy value to a threshold value, and recording the block of data as suspicious when the entropy value exceeds the threshold value. The method may further include reporting suspicious data to an administrator. Calculating an entropy value may include calculating Shannon Entropy for the block of data, calculating a global entropy value for the block of data, and calculating a sample entropy value for the block of data.

Other systems, methods, features, and advantages consistent with the present invention will become apparent to one with skill in the art upon examination of the following figures and detailed description. It is intended that such additional systems, methods, features, and advantages be included within this description and be within the scope of the invention.

BRIEF DESCRIPTION OF THE DRAWINGS

The accompanying drawings, which are incorporated in and constitute a part of this specification, illustrate an implementation of methods and systems consistent with the present invention and, together with the description, serve to explain advantages and principles consistent with the invention. In the drawings.

DETAILED DESCRIPTION

Reference will now be made in detail to an implementation consistent with the present invention as illustrated in the accompanying drawings.

Figure 1:
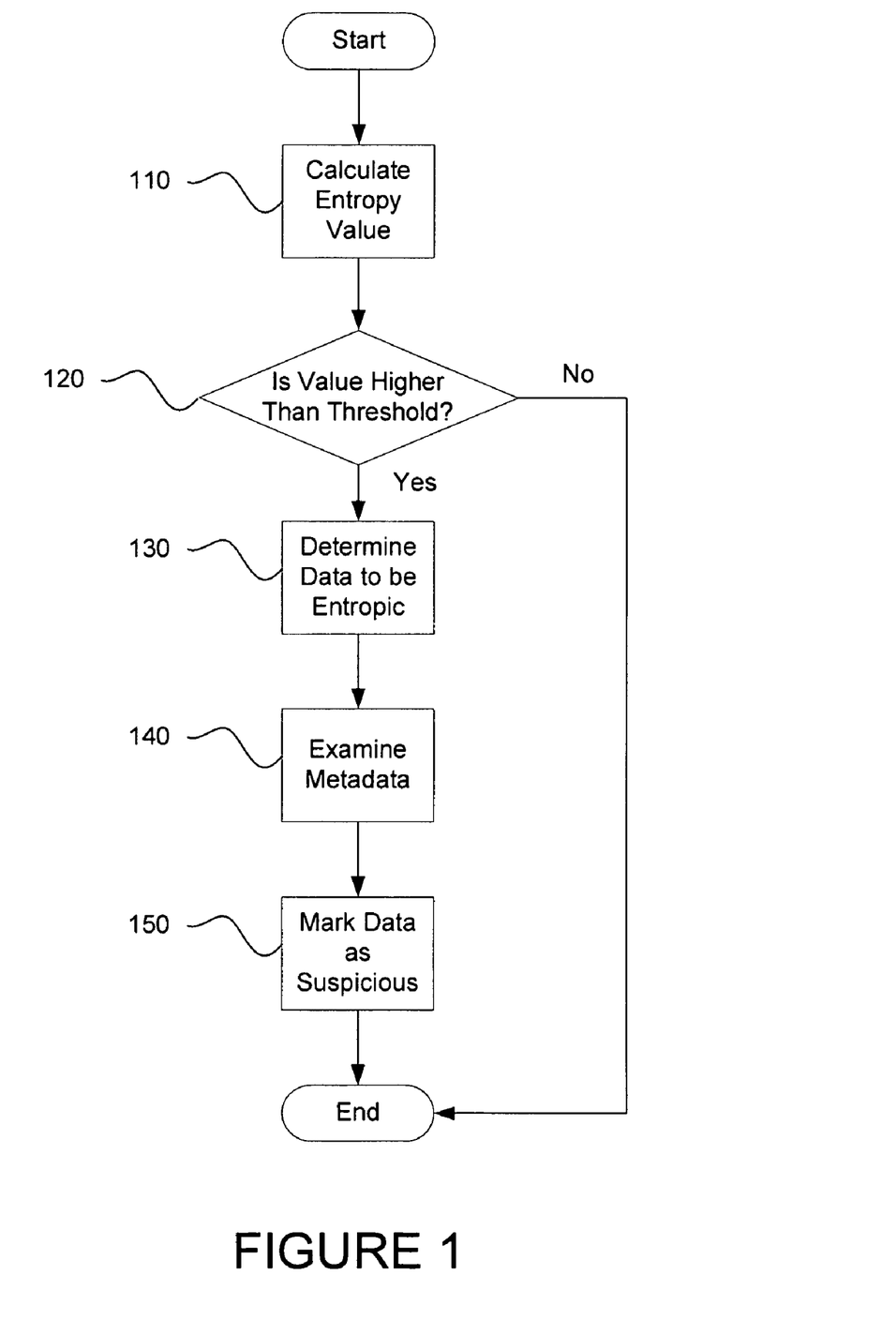
FIG. 1 illustrates an overview of a method of detecting malware using an entropy calculation consistent with the present invention.

FIG. 1 illustrates an overview of a method for detecting malware by calculating data entropy. At step 110, an entropy value is calculated for a data block. At step 120, the calculated entropy value is compared to a threshold. If the value is higher than a predetermined threshold, the data is determined to be entropic at step 130. Entropic data is then further examined at step 140. During this step, metadata associated with the data is examined to determine whether the data is suspicious. If the data is determined to be suspicious, the data is marked as such at step 150. A user or administrator may be notified.

Figure 2:
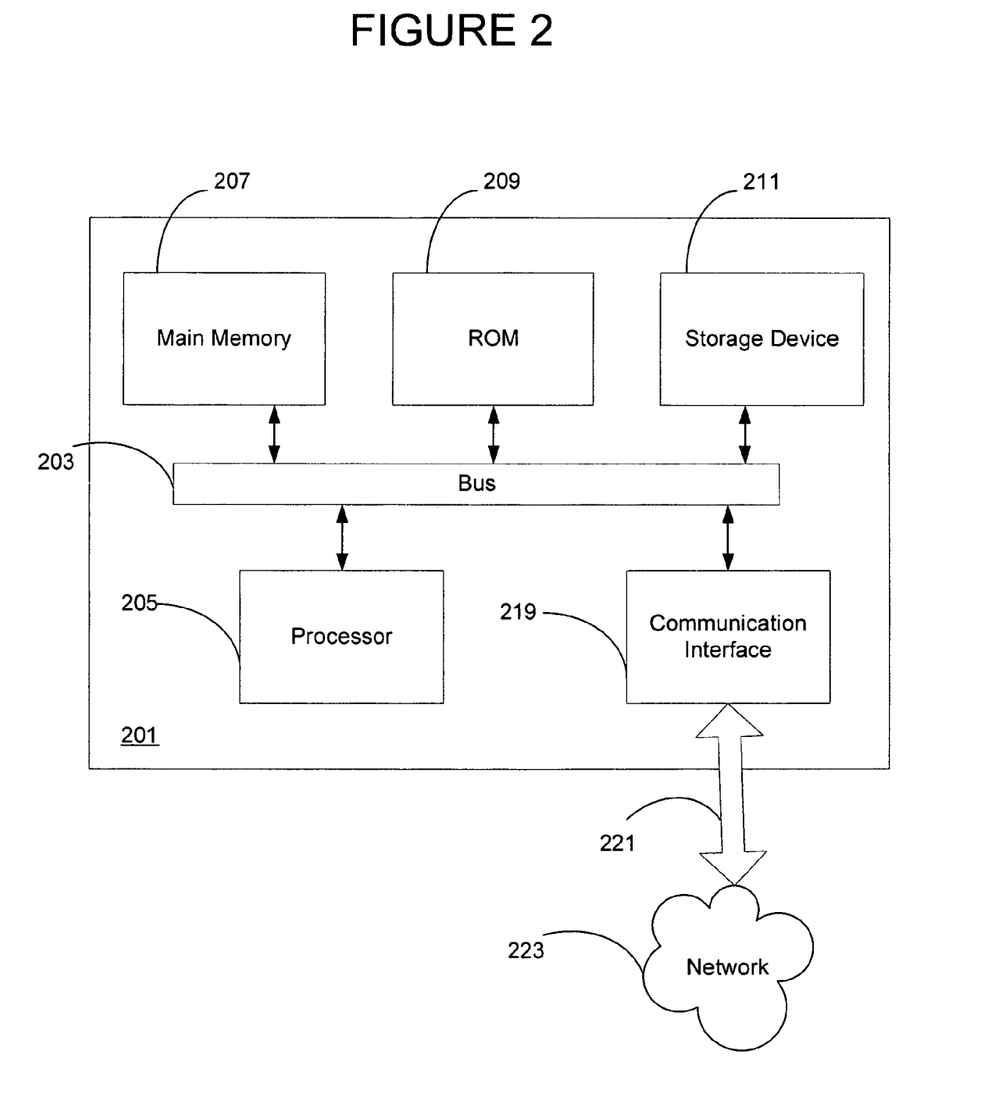
FIG. 2 illustrates an exemplary computer system.

Turning to FIG. 2, an exemplary computer system consistent with various embodiments in accordance with the present invention is now described. Computer system 201 includes a bus 203 or other communication mechanism for communicating information, and a processor 205 coupled with bus 203 for processing the information. Computer system 201 also includes a main memory 207, such as a random access memory (RAM) or other dynamic storage device, coupled to bus 203 for storing information and instructions to be executed by processor 205. An embodiment consistent with the present invention for detecting malware by calculating data entropy, such as that described in FIG. 1, may be implemented as a computer program loaded in main memory 207. In addition, main memory 207 may be used for storing temporary variables or other intermediate information during execution of instructions to be executed by processor 205. Computer system 201 further includes a read only memory (ROM) 209 or other static storage device coupled to bus 203 for storing static information and instructions for processor 205. A storage device 211, such as a magnetic disk or optical disk, is provided and coupled to bus 203 for storing information and instructions.

According to one embodiment, processor 205 executes one or more sequences of one or more instructions contained in main memory 207. Such instructions may be read into main memory 207 from another computer-readable medium, such as storage device 211. Execution of the sequences of instructions in main memory 207 causes processor 205 to perform the process steps described herein. One or more processors in a multi-processing arrangement may also be employed to execute the sequences of instructions contained in main memory 207. In alternative embodiments, hard-wired circuitry may be used in place of or in combination with software instructions. Thus, embodiments are not limited to any specific combination of hardware circuitry and software.

Further, the instructions to support the system interfaces and protocols of system 201 may reside on a computer-readable medium. The term "computer-readable medium" as used herein refers to any medium that participates in providing instructions to processor 205 for execution. Common forms of computer-readable media include, for example, a floppy disk, a flexible disk, hard disk, magnetic tape, a CD-ROM, magnetic, optical or physical medium, a RAM, a PROM, and EPROM, a FLASH-EPROM, any other memory chip or cartridge, or any other medium from which a computer can read.

Computer system 201 also includes a communication interface 219 coupled to bus 203. Communication interface 219 provides a two-way data communication coupling to a network link 221 that is connected to a local network 223. For example, communication interface 219 may be a network interface card. As another example, communication interface 219 may be an asymmetrical digital subscriber line (ADSL) card, an integrated services digital network (ISDN) card or a modem to provide a data communication connection to a corresponding type of telephone line. Wireless links may also be implemented. In any such implementation, communication interface 219 sends and receives signals that carry digital data streams representing various types of information.

A description of calculating entropy is now provided. There are several mathematical methods for generating a numeric understanding of the entropy, or "randomness", of a block of data or signal. In one embodiment consistent with the present invention, an entropy determination method uses a calculation first described by Claude Shannon that is now commonly referred to as Shannon Entropy, as follows:

$$H(X) = \sum_{i=1}^{n} p(x_i) \log_2 \left( \frac{1}{p(x_i)} \right)$$

where p(x) is the probability of x given the discrete random variable X. Since X is discrete, an alphabet is chosen. Since the data is binary digital data organized in bytes (or 8-bit blocks), the alphabet should be the set {0..255}, or in binary, '00000000' through '11111111'. This will require a minimum block of scanned data to be 256 bytes in length. While this is not a requirement, the value H(X) will be different depending on the alphabet used. The value is normalized such that
PH(X) ∈ 0.0 ... 1.0
where $$PH(X)=H(X)|MAX(H(X))$$

In short, the entropy value calculated through application of this method is a number between 0 and 1, where values closer to 1 indicate higher degrees of entropy in a given block of data. For a more thorough discussion of Shannon Entropy, see Shannon, C. E. "A Mathematical Theory of Communication." The Bell System Technical J 27, 379-423 and 623-656, July and October 1948, which is incorporated by reference. Once again, any valid entropy calculation method could be used for this purpose—Shannon Entropy is an example implementation.

Figure 3:
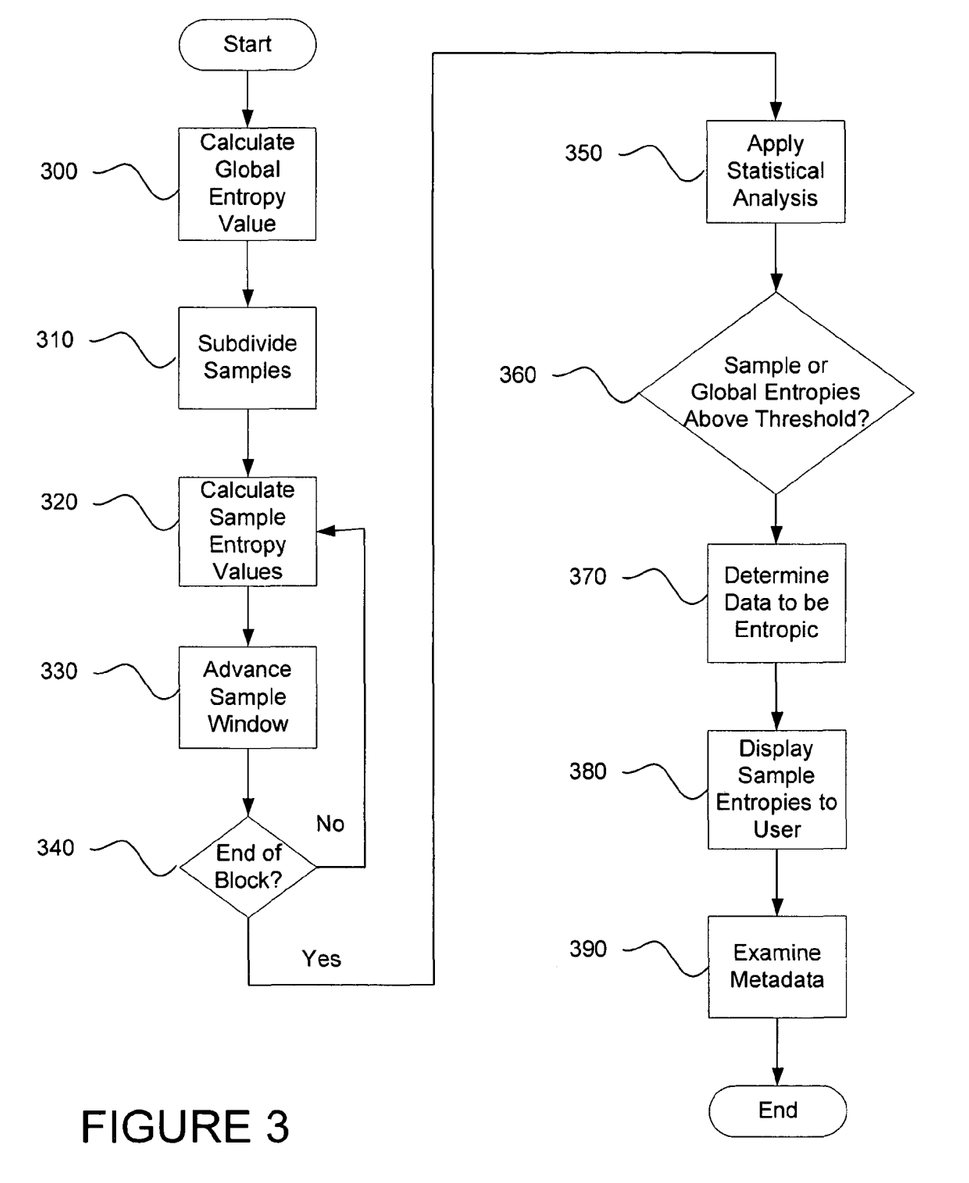
FIG. 3 illustrates a detailed flowchart of a method of detecting malware using an entropy calculation consistent with the present invention.

FIG. 3 depicts a process for determining whether data is suspicious based on a level of entropy in the data. At step 300, a block of data (hereafter "Source") is acquired to determine the level entropy in the data. A global entropy value is calculated for entropy across the entire data block (hereafter Global Entropy). In one embodiment consistent with the present invention, the Shannon Entropy method is used, as described above. At step 310, a determination of how to subdivide the Source into sample blocks (hereafter "Samples") is made. Sample size is determined based on the following characteristics:

The minimum size of the Sample is the size of the alphabet selected for use in the entropy algorithm (see the discussion of Shannon Entropy above).

The maximum size is the size of the Source. However, this is suboptimal since it takes away the ability to see entropy levels at different points inside the Source.

The optimal size of a Sample allows for multiple Samples inside of a Source, where Sample is some multiple of alphabet size. In general, allowing for greater Samples provides more information about entropy within the Source.

Note the Sample is tunable, as is the alphabet size selected for use in an entropy calculation algorithm. An entropy determination technique can be applied across a control set of data in order to empirically determine the optimum settings.

At step 320, entropy is calculated within Sample blocks inside of the Source. An embodiment consistent with the invention starts at the beginning of the Source and takes as input a Sample-sized continuous portion of the block (See FIG. 4). For purposes of this discussion, it is assumed that the Source is X bytes in size, and the Sample is Y bytes in size where Y is no larger than 0.5*X. The entropy calculation is applied to this Sample.

Figure 4:
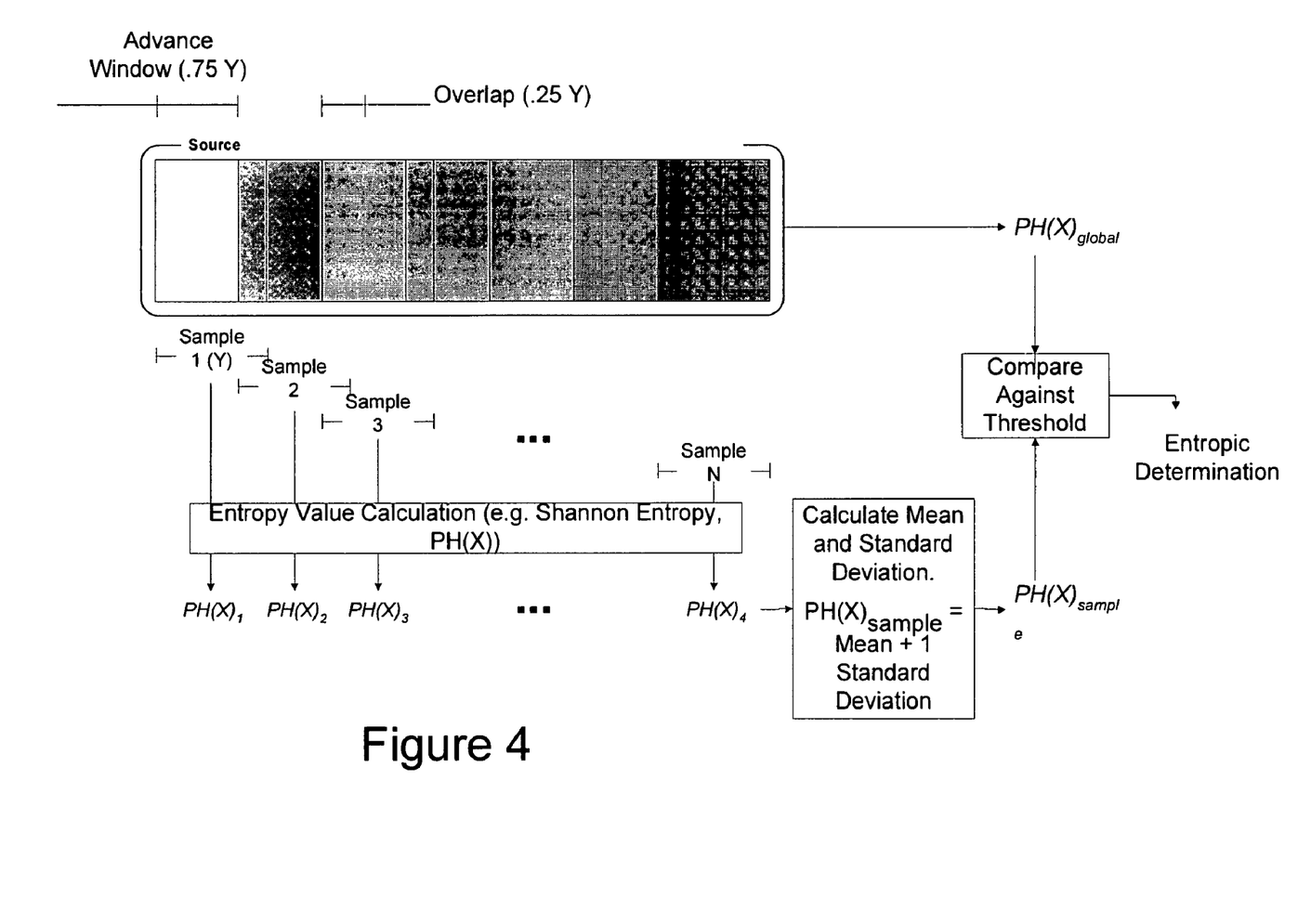
FIG. 4 illustrates a sampling technique for calculating entropy across a data block consistent with the present invention.

At step 330, the Sample window is advanced forward such that it overlaps with the previous Sample (See FIG. 4). In an exemplary embodiment, this overlap window is 25%. In other words, the first Sample measured entropy between bytes 0 and Y inside of the Source. The second Sample measures entropy between bytes 0.75(Y) and (0.75(Y)+Y). Much like alphabet and Sample size selection, this is tunable.

At step 340, the Sample window is advanced repeatedly, as in step 330 above, until the end of the data block is reached and there is an entropy value for every Sample window (See FIG. 4). At step 350, a statistical method is applied across the entropy values from all of the Samples. In an exemplary embodiment consistent with the present invention, the mean and standard deviation of all entropy values from all Samples is calculated. The aggregate entropy for the Source (hereafter Sample Source Entropy) is then derived by taking the mean and adding one standard deviation to it.

At step 360, the Sample Source Entropy and Global Entropy are compared to a threshold (See FIG. 4). This threshold is an empirically derived value between 0 and 1. If either entropy value is greater than the threshold, the data block is determined to be entropic at step 370. In the exemplary implementation, 0.9 is used as the threshold value. However, this is tunable according to circumstances and direct observations. One of ordinary skill in the art will understand how to determine an entropy threshold without undue experimentation. For example, a sample set of entropy values for data such as operating system files, programs, user-generated documents, etc., may be calculated. Entropy values for a library of malware with a broad range of functionality and obfuscation characteristics (packed, unpacked, etc) may also be calculated. Based on this experimentation and other observation, one of ordinary skill in the art may determine an appropriate entropy threshold value.

Optionally, at step 380, the spectrum of entropy values for all Samples within a Source can be displayed to a user of the Invention, regardless of whether or not the Source was determined to be entropic. This may be useful in a number of circumstances—for example, when reverse engineering malware to identify methods and indicators of a compromised computer system.

At step 390, once the entropic determination is complete, the metadata associated with the Source can be examined to identify whether certain aspects of its structure may, when combined with the entropic determination, indicate whether the Source is encrypted data, a Packed Executable, or some other form of malware. The structure of the file is examined, the composition of its sections are examined, and a determination is made as to whether what's contained in each section matches up with what the metadata describes. In an executable section, encrypted data is not typically present. There is typically enough structure in computer instructions to keep the entropy for a section like that below the 0.9 threshold. However, any section that serves a primary function to store data that may or may not be encrypted, obfuscated, or compressed data could drive up entropy. The file may be entropic, but it may not be a suspicious occurrence.

Examples of metadata include file type, the type of different sections contained in a file, and the permissions associated with individual sections (readable, writable, executable). For example, a file that is a Windows executable may have several sections. A "resource" section typically contains data that the program uses to execute. Entropy in the "resource" section may not necessarily be suspicious. However, entropy in a section of the file that contains program instructions (e.g., a file section marked "executable" or "contains code") would be suspicious and would probably indicate the file was a Packed Executable.

Figure 5:
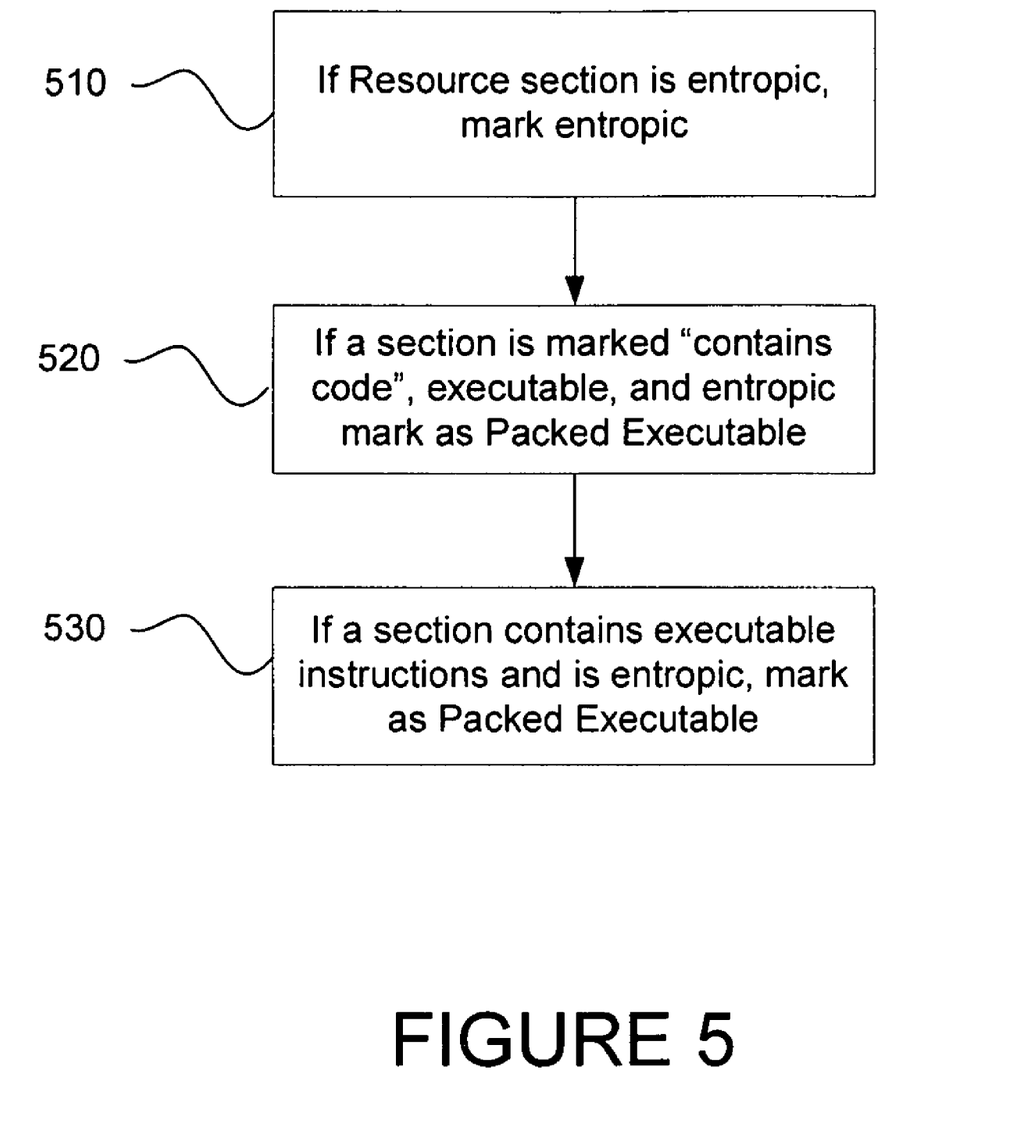
FIG. 5 illustrates a method of entropic determination and metadata analysis to determine suspicious data consistent with the present invention.

In an exemplary operation, an examination of files from Windows operating system-based computers is performed to classify files and their category of entropy. Windows files have different sections, each of which has a specific function when behaving normally. An exemplary examination of entropic determination and metadata for various sections is depicted in FIG. 5.

At step 510, if the Resource (or rsrc) section is entropic, the file is noted as entropic but not necessarily suspicious. At step 520, if a section that is not the Resource section is marked as "contains code" or executable (permissions associated with the section as described in Microsoft's Portable Executable and Common Object File Format Specification), and it's entropic, then file is marked as a Packed Executable. At step 530, if a section that is not the Resource section contains executable instructions and is entropic, then the file is marked as a Packed Executable.

One of ordinary skill in the art will recognize that any number of metadata analyses may be exploited in order to increase the accuracy and type of determinations that can be made when coupled with an entropic determination. The example explained above describes the function of the Invention when looking at files stored on a system in order to identify Packed Executables. The same approach could be applied against different elements of a file on disk, portions of system or process memory, or any other stream of data where its randomness may be an indication of an anomaly or other state that a user wishes to detect.

While there has been illustrated and described embodiments consistent with the present invention, it will be understood by those skilled in the art that various changes and modifications may be made and equivalents may be substituted for elements thereof without departing from the true scope of the invention. Therefore, it is intended that this invention not be limited to any particular embodiment disclosed, but that the invention will include all embodiments falling within the scope of the appended claims.

We claim:

1. A malware detection method, the method comprising the steps of:
    calculating a global entropy value for a block of data, said block of data comprising a plurality of data samples;
    iteratively calculating an individual sample entropy value for each of the plurality of data samples to create a plurality of individual sample entropy values, wherein each of the plurality of data samples contains at least a portion of data overlapping at least one of an immediately preceding data sample and an immediately subsequent data sample;
    performing a statistical method on the plurality of individual sample entropy values;
    comparing at least one of the global entropy value and an individual sample entropy value to a threshold value; and
    recording the block of data as suspicious when at least one of the global entropy value and an individual sample entropy value exceeds the threshold value.

2. The method of claim 1, further comprising reporting suspicious data to an administrator.

3. The method of claim 1, wherein calculating an entropy value includes calculating Shannon Entropy for the block of data.

4. The method of claim 1, wherein performing a statistical method includes:
    calculating the mean and standard deviation of the plurality of individual sample entropy values; and
    adding one standard deviation to the mean.

5. The method of claim, 1 wherein comparing the entropy value to a threshold value includes comparing both the global entropy value and the sample entropy value to the threshold.

6. The method of claim 1, wherein the portion of data overlapping at least one of the immediately preceding data sample and the immediately subsequent data sample is tunable.

7. The method of claim 1, further comprising examining metadata for the block of data for suspicious features, wherein said metadata comprises at least one of file type, type of different sections contained in a file, and permissions associated with individual sections within a file.

8. The method of claim 1, wherein the threshold is 0.9.

9. A computer-readable device having computer-executable instructions for performing a method of malware, the method comprising the steps of:
    calculating a global entropy value for a block of data, said block of data comprising a plurality of data samples;
    iteratively calculating an individual sample entropy value for each of the plurality of data samples to create a plurality of individual sample entropy values, wherein each of the plurality of data samples contains at least a portion of data overlapping at least one of an immediately preceding data sample and an immediately subsequent data sample;
    performing a statistical method on the plurality of individual sample entropy values;
    comparing at least one of the global entropy value and an individual sample entropy value to a threshold value; and
    recording the block of data as suspicious when at least one of the global entropy value and an individual sample entropy value exceeds the threshold value.

10. The computer-readable device of claim 9, the method further comprising reporting suspicious packets to an administrator.

11. The computer-readable device of claim 9, wherein calculating an entropy value includes calculating Shannon Entropy for the block of data.

12. The computer-readable device of claim 9, wherein performing a statistical method includes:
    calculating the mean and standard deviation of the plurality of individual sample entropy values; and
    adding one standard deviation to the mean.

13. The computer-readable device of claim 9, wherein comparing the entropy value to a threshold value includes comparing both the global entropy value and the sample entropy value to the threshold.

14. The computer-readable device of claim 9, wherein the portion of data overlapping at least one of the immediately preceding data sample and the immediately subsequent data sample is tunable.

15. The computer-readable device of claim 9, the method further comprising examining metadata for the block of data for suspicious features, wherein said metadata comprises at least one of file type, type of different sections contained in a file, and permissions associated with individual sections within a file.

16. The computer-readable device of claim 9, wherein the threshold is 0.9.

* * * * *